US012098010B2

(12) United States Patent
Loucks

(10) Patent No.: US 12,098,010 B2
(45) Date of Patent: Sep. 24, 2024

(54) CONTAINER FOR STORING, TRANSPORTING AND DISPENSING A BEVERAGE

(71) Applicant: Square Keg, LLC, Spokane, WA (US)

(72) Inventor: Tim Loucks, Spokane, WA (US)

(73) Assignee: Square Keg, LLC, Spokane, WA (US)

( * ) Notice: Subject to any disclaimer, the term of this patent is extended or adjusted under 35 U.S.C. 154(b) by 963 days.

(21) Appl. No.: 17/044,435

(22) PCT Filed: Apr. 3, 2019

(86) PCT No.: PCT/US2019/025553
§ 371 (c)(1),
(2) Date: Oct. 1, 2020

(87) PCT Pub. No.: WO2019/195339
PCT Pub. Date: Oct. 10, 2019

(65) Prior Publication Data

US 2021/0032004 A1 Feb. 4, 2021

Related U.S. Application Data

(60) Provisional application No. 62/761,774, filed on Apr. 5, 2018.

(51) Int. Cl.
*B65D 77/06* (2006.01)
*B65D 85/72* (2006.01)
*B67D 1/00* (2006.01)

(52) U.S. Cl.
CPC ............ *B65D 77/06* (2013.01); *B65D 85/72* (2013.01); *B67D 1/0004* (2013.01)

(58) Field of Classification Search
CPC ........ B65D 77/06; B65D 85/72; B65D 84/72; B67D 1/0004; B67D 3/0061; A45F 3/18
See application file for complete search history.

(56) References Cited

U.S. PATENT DOCUMENTS 3,214,052 A * 10/1965 Dike .................. B65D 21/0231 215/373
5,199,570 A * 4/1993 McKenzie ........... B65D 25/282 206/509
6,666,358 B1 12/2003 Field
(Continued)

OTHER PUBLICATIONS

Notification of Transmittal of the International Search Report and the Written Opinion of the International Searching Authority, or the Declaration, PCT/US19/25553, Jun. 21, 2019.
(Continued)

*Primary Examiner* — Andrew T Kirsch
(74) *Attorney, Agent, or Firm* — Randall Danskin P.S.

(57) ABSTRACT

A container for storing, shipping and dispensing a beverage comprises a generally rectilinear body defining an interior volume and having, a generally planar front side, a generally planar rear side, a generally planar first lateral side, and a generally planar second lateral side, and plural curvilinear corner portions, and a top, and a bottom, and a tap coupler anchor defining a spear hole that communicates with the interior volume, and the tap coupler anchor releasably engages with a dispensing coupler which fluidically communicates with the spear hole to dispense the beverage from within the interior volume of the generally rectilinear body.

20 Claims, 10 Drawing Sheets

(56) References Cited

U.S. PATENT DOCUMENTS

| | | | |
|---|---|---|---|
| D876,745 | S | 2/2020 | Loucks |
| D885,704 | S | 5/2020 | Loucks |
| D887,105 | S | 6/2020 | Loucks |
| 2001/0015331 | A1 | 8/2001 | Przytulla |
| 2008/0121639 | A1 | 5/2008 | Dohnert et al. |
| 2012/0228311 | A1 | 9/2012 | Sauer et al. |
| 2016/0100604 | A1 | 4/2016 | Rubin |

OTHER PUBLICATIONS

Miscellaneous PCT Documents.

* cited by examiner

CONTAINER FOR STORING, TRANSPORTING AND DISPENSING A BEVERAGE

CROSS REFERENCE TO RELATED APPLICATIONS

This US Utility Patent Application is a US National Stage application of International App. No. PCT/US2019/025553, filed on 3 Apr. 2019 and titled "Container for Storing, Transporting and Dispensing a Beverage", "which claims the benefit of priority to earlier filed U.S. Provisional Patent Application No. 62/761,774, filed on 5 Apr. 2018 and titled "Container for Storing, Transporting and Dispensing a Beverage". Both of the aforementioned patent applications are hereby expressly incorporated herein by this reference in their entirety. The inventorship of the current US Utility Patent Application, the referenced and incorporated PCT Patent application, and the referenced and incorporated US Provisional Patent Application is the same.

FIELD OF INVENTION

This invention relates to vessels, and more particularly to vessels for storing, transporting and dispensing beverages such as, but not limited to, beer.

BACKGROUND OF THE INVENTION AND DESCRIPTION OF RELATED ART

Nearly all consumable beverages are made, brewed, formulated, fermented and/or distilled at a location other than at a location where the beverage is consumed by an end user/consumer. It is therefore necessary to have a container that provides for storage and transport and dispensing of the beverage to the end consumer. The storage container must preserve the quality of the beverage and yet be sturdy enough to endure multiple uses and reuses and repeated cleaning.

"Kegs" are known in the bulk beverage industry and are used to store, transport, and dispense bulk quantities of beverages. Known "kegs" have a generally cylindrical (barrel-like) configuration and are generally constructed using 304 Stainless Steel. "Kegs" are available in multiple sizes that contain different volumes of beverage. Kegs utilize a re-usable "spear assembly" that penetrates the top center of the keg and extends into the interior volume defined by the keg. The spear assembly communicates between the exterior of the keg and the interior volume and provides a means for controllably accessing/dispensing the beverage contained within the interior volume, commonly with the assistance of a compressed gas.

One recognized drawback to known kegs is that the cylindrical shape does not maximize the "footprint" of the cylindrical keg diameter. Walk-in refrigeration units, under-counter refrigeration, transport vehicles, warehouses, hand trucks, and beverage production facilities are all generally designed and built using the concept of a square. Further, in the beverage selling industry, space is a finite commodity and beverages, and more particularly beverages containing alcohol, are generally recognized to be one of the largest revenue generators. For that reason, and others, maximizing every square inch of available space that can be used to store, and keep cold, a liquid beverage is an important objective.

When the height and diameter dimensions of a cylindrical keg are examined (the "footprint"), and the same height and diameter dimensions (the same "footprint") of a rectilinear keg is examined, the volume capacity of the rectilinear keg is 20-30% greater than that of a cylindrical keg having the same "footprint".

Another recognized drawback of known cylindrical kegs is that the valve is positioned on the top center the cylindrical keg. With the valve located in this position, it is not possible to vertically stack kegs while the kegs are tapped to access the beverage therein. Because storage, transport, refrigeration, and serving space is limited, the ability to stack kegs while they are tapped provides an additional improvement.

A still further, and relatively new drawback to known kegs is their large size and lack of ease of transportability and storability. This drawback is likely, at least partially, the result of the growing popularity of micro-breweries, and the custom/seasonal beverages (beer, cider, etc.) they produce and sell. The consuming public has generated a need for, and is demanding, access to microbrewery products at locations and times other than while be being physically present at microbrewery locations. The market has responded to this need, and attempted to meet this need, with "growlers" which are typically generally cylindrically shaped gallon size bottles formed of glass, or plastic, with screw-on lids/caps. Consumers can purchase "growlers" of beverages at microbreweries, which allow the consumer to take a gallon size serving of a desired beverage to another/different location/event. Such "growlers" are refillable, however, glass containers are breakable, and plastic containers can negatively affect taste. Further, neither glass nor plastic containers retain the carbonation of the beverage, which causes the contained beverage to rapidly deteriorate in quality which eliminates the ability of a consumer to store/retain the beverage for any amount of time. Even further still, cylindrical shaped glass containers are notoriously difficult to transport without breaking, and they suffer the same drawbacks as full-size kegs, namely small contained quantity of beverage when measured against the size of container "foot-print".

What is needed is a sturdy and reusable bulk beverage container that has increased volume capacity without increasing container footprint size, maximizes storage and refrigeration space, and enables kegs to be stacked while tapped My rectilinear kegs for storage, transport and dispensing of beverages resolves these and other drawbacks and limitations to the known cylindrical kegs. My rectilinear kegs can be manufactured using various materials including, but not limited to, stainless steel, alloys, polymers, plastics, composites and recyclable materials and are constructed in a rectilinear configuration, which maximizes the fluidic volume capacity while maintaining a footprint size that is comparable to the footprint size of a cylindrical keg.

My rectilinear kegs are an improvement over cylindrical kegs, because they enable the consumer/user to store, transport, and dispense 20-30% more volume within the same or smaller footprint as a cylindrical keg of comparable dimensions. My rectilinear kegs promote lowered freight costs, lower storage costs, increased revenue, more efficient use of space, and increased capacity for refrigerated beverage product within an existing area.

My rectilinear kegs have a stackable design and an angulated tap face and angulated spear axis that enables the keg valve to be positioned at a location that is other than at the top center of the keg. Users are able to vertically stack one or more of my generally rectilinear kegs on top of one another, and still be able to simultaneously tap all of the vertically stacked rectilinear kegs to facilitate dispensing and serving of the beverage. Costly, cumbersome and space consuming shelving systems may therefore be eliminated.

Some or all of the drawbacks, and limitations and problems identified above, and other drawbacks, limitations and problems known and not known and/or not yet recognized, may be helped or solved by my invention shown and described herein. My invention may also be used to address other problems not set out herein, or which become apparent later.

My invention does not reside in any single one of the identified features individually, but rather in the synergistic combination of all of its structures, which give rise to the functions necessarily flowing therefrom as hereinafter specified and claimed.

My invention, as described hereinafter, avoids the detriments associated with the prior art practices and products, and provides a new apparatus which allows brewers and beverage producers and beverage sellers an improved product for storing, transporting and dispensing product in a manner not possible, heretofore.

BRIEF SUMMARY OF THE INVENTION

A first aspect of the present invention relates to a container for storing, shipping and dispensing a beverage comprising a generally rectilinear body defining an interior volume, the generally rectilinear body having a generally planar front side, a generally planar rear side, a generally planar first lateral side, a generally planar second lateral side, and plural curvilinear corner portions, each curvilinear corner portion structurally interconnecting adjacent side edges of the generally planar front side, rear side, first lateral side and second lateral side, and a top structurally interconnected to top edges of the generally planar front side, rear side, first lateral side, second lateral side and the plural curvilinear corner portions, and a bottom structurally interconnected to bottom edges of the generally planar front side, rear side, first lateral side, second lateral side and the plural curvilinear corner portions; and a tap coupler anchor structurally carried by the generally rectilinear body, the tap coupler anchor defining a spear hole that communicates with the interior volume of the generally rectilinear body, and the tap coupler anchor releasably engages with a spear assembly and a dispensing coupler which fluidically communicates with the interior volume through the spear hole so as to dispense the beverage from within the interior volume of the generally rectilinear body.

A further aspect of the present invention is wherein the tap coupler anchor is carried at an upper corner portion of the generally rectilinear body, and the upper corner portion of the generally rectilinear body interconnects one of the generally planar sides of the generally rectilinear body and the top of the generally rectilinear body.

A further aspect of the present invention is wherein the container further comprises a tap recess defined in one of the generally planar sides of the generally rectilinear body spacedly below the top of the body and protruding inwardly from the generally planar side into the interior volume, the tap recess carrying the tap anchor at a generally medial position on a base portion of the tap recess, so as to position the tap anchor inward of, and set back from, an exterior facing surface of the generally planar side of the generally rectilinear body.

A further aspect of the present invention is wherein the tap coupler anchor is carried on one of the generally planar sides of the body and spacedly below the top of the body.

A further aspect of the present invention is wherein the spear hole defines an axis, and the axis defined by the spear hole is angulated downwardly and inwardly into the interior volume, and the spear hole axis is not vertical, and the spear hole axis is not horizontal.

A further aspect of the present invention is wherein the spear hole axis is horizontal.

A further aspect of the present invention is wherein the container further comprises a top handle structurally interconnected to the body at the top of the body, the top handle having a tubular handle rail with plural spaced apart side portions, each tubular handle rail side portion having two opposing ends, and plural handle rail corner portions structurally interconnect adjacent ends of the plural tubular handle rail side portions of the tubular handle rail so as to form the top handle, and plural top handle supports, each of the plural top handle supports having a top edge, a bottom edge and two opposing end portions, and each top handle support structurally interconnects, at the top edge thereof, with one of the plural handle rail corner portions of the top handle tubular rail, and the bottom edge of each of the plural top handle supports is structurally interconnected with the body at the top of the body, and the plural top handle supports position the top handle spacedly above the top of the body.

A further aspect of the present invention is wherein the container further comprises a bottom flange that is structurally interconnected to the body at the bottom of the body, the bottom flange having, plural spaced apart side portions, each of the plural side portions having a top edge and a bottom edge and two opposing and spaced apart end portions, and plural corner portions, each of the plural corner portions structurally interconnecting adjacent end portions of each of the plural side portions of the bottom flange to form a bottom base, and the top edge of each of the plural bottom flange side portions is structurally interconnected to the bottom of the body; and a tubular bottom rail is structurally interconnected to the bottom edge of each of the plural bottom edge flange side portions and to a bottom edge of each of the plural bottom flange corner portions.

A further aspect of the present invention is wherein the container further comprises a concave and inwardly protruding annular depression defined in, and spacedly arrayed about the body, the concave and inwardly protruding annular depression extending circumferentially about the body spacedly between the top of the body and the bottom of the body.

A further aspect of the present invention is wherein the generally planar front side, the generally planar rear side, the generally planar first lateral side and the generally planar second lateral side, and each of the curvilinear corner portions, and the top and the bottom and the tap anchor are all formed of stainless steel.

A further aspect of the present invention is wherein the top of the body has plural opposing and spaced apart edge portions and an inwardly/downwardly protruding concave center portion, and the plural opposing and spaced apart edge portions of the top are structurally interconnected to top edges of the generally planar front side, rear side, first lateral side, second lateral side and the plural curvilinear corner portions so as to form a generally concave top of the body.

A further aspect of the present invention is wherein the bottom of the body has plural opposing and spaced apart edge portions and an outwardly/downwardly convexly protruding center portion, and the plural opposing and spaced apart edge portions of the bottom are structurally interconnected to bottom edges of the generally planar front side, rear side, first lateral side, second lateral side and the plural curvilinear corner portions so as to form a generally convex bottom of the body.

A further aspect of the present invention is wherein the container further comprises an angulated tap face that structurally communicates between the top edge of one generally planar side and an adjacent edge of the top, and the angulated tap face carries the tap coupler anchor and defines the spear hole communicating with the interior volume.

A further aspect of the present invention is wherein the container for storing, shipping and dispensing a bulk quantity of beverage comprises: a generally rectilinear stainless steel body defining an interior volume, the generally rectilinear body having, a front side, a rear side, a first lateral side and a second lateral side, each of the front side, the rear side, the first lateral side and the second lateral side having spaced apart opposing side edge, spaced apart opposing top and bottom edges, an interior facing surface and an exterior facing surface; and plural curvilinear corner portions, each of the plural curvilinear corner portions defines a radius and structurally interconnects adjacent side edges of the front side, the rear side, the first lateral side and the second lateral side so as to form the generally rectilinear stainless steel body; and a top having plural opposing and spaced apart edge portions and an inwardly/downwardly concavely protruding center portion, and the plural opposing and spaced apart edge portions of the top are structurally interconnected to the top edges of the front side, the rear side, the first lateral side, the second lateral side and the plural curvilinear corner portions so as to form the top of the generally rectilinear stainless steel body; and a bottom having plural opposing and spaced apart edge portions and an outwardly/downwardly convexly protruding center portion, and the plural opposing and spaced apart edge portions of the bottom are structurally interconnected to the bottom edges of the front side, the rear side, the first lateral side, the second lateral side and the plural curvilinear corner portions so as to form the bottom of the generally rectilinear stainless steel body; and a concave and inwardly protruding annular depression defined in the generally rectilinear body, the concave and inwardly protruding annular depression extending circumferentially about the generally rectilinear body spacedly between the top and bottom of the generally rectilinear body; a top handle structurally interconnected to the generally rectilinear body at the top of the generally rectilinear body, the top handle having a tubular handle rail with plural spaced apart side portions, each tubular handle rail side portion having two opposing ends, and plural handle rail corner portions structurally interconnecting adjacent ends of the plural tubular handle rail side portions of the tubular handle rail so as to form the top handle, and plural top handle supports, each of the plural top handle support having a top edge, a bottom edge and two opposing end portions, and each top handle support structurally interconnects, at the top edge thereof, with one of the plural handle rail corner portions of the top handle, and the bottom edge is structurally interconnected with the generally rectilinear body at the top of the generally rectilinear body, each of the plural top handle supports defining a cutout, and the plural top handle supports position the top handle spacedly above the top of the generally rectilinear body; a bottom flange structurally interconnected to the generally rectilinear body at the bottom of the generally rectilinear body, the bottom flange having, plural spaced apart side portions, each of the plural side portions having a top edge and a bottom edge and two opposing and spaced apart end portions, and plural corner portions, each of the plural corner portions structurally interconnecting adjacent end portions of the side portions of the bottom flange, and the top edge of each of the plural bottom flange side portions is structurally interconnected to the bottom of the generally rectilinear body, and a tubular bottom rail structurally interconnected to the bottom edge of each bottom edge flange side portion and a bottom edge of each of the plural bottom flange corner portions; and a distance dimension between exterior facing surfaces of diametrically opposing side portions of the bottom flange is less than a distance dimension between interior facing surfaces of diametrically opposing side portions of the top handle so that the bottom flange of the generally rectilinear body axially fits within the top handle of a second generally rectilinear body to facilitate vertical stacking of plural generally rectilinear bodies; and a tap coupler anchor is structurally carried by the generally rectilinear body, the tap coupler anchor defining a spear hole that communicates with the interior volume of the generally rectilinear body, and the tap coupler anchor releasably engages with a dispensing coupler which fluidically communicates with the spear hole so as to dispense the beverage from within the interior volume of the generally rectilinear body.

A further aspect of the present invention is wherein the container further comprises a tap recess defined in one of the generally planar sides of the generally rectilinear body spacedly below the top of the generally rectilinear body and the tap recess protrudes inwardly from the generally planar side into the interior volume and is set-back from the exterior facing surface of the body, the tap recess having a top portion, a bottom portion, a first side portion, a second side portion and a base portion, each of the top portion, the bottom portion, the first side portion, the second side portion and the base portion having opposing edge portions that are structurally interconnected to an adjacent edge portion of an adjacent tap recess portion so as to form a unitary tap recess, and outer edge portions of the tap recess are structurally interconnected to an interior facing surface of the generally planar side of the generally rectilinear body to form a fluid tight and air tight interconnection therebetween; a tap coupler anchor is structurally carried at a generally medial position on the base portion of the tap recess to releasably engage with a tap spear, and a spear hole is defined by the tap coupler anchor, and the spear hole communicates with the interior volume of the generally rectilinear body to allow the tap spear assembly to be at least partially inserted into the interior volume.

A further aspect of the present invention is wherein the bottom flange of the body has a side to side dimension that fits axially within an interior side to side dimension of the top handle to facilitate vertical stacking of plural bodies.

A still further aspect of the present invention is wherein the tap coupler anchor is set-back from the exterior surface of the body, and the angulated tap face and the set-back allow plural vertically stacked bodies to be simultaneously tapped to allow beverage to be dispensed from within the interior cavity while plural bodies are vertically stacked one on top of another.

In a still further aspect, the present invention provides a container for storing, shipping and dispensing a bulk quantity of beverage comprising: a generally rectilinear stainless steel body defining an interior volume, the generally rectilinear body having, a generally planer front side, a generally planer rear side, a generally planer first lateral side and a generally planer second lateral side, each of the generally planer front side, the generally planer rear side, the generally planer first lateral side and the generally planer second lateral side having spaced apart opposing side edges spaced apart opposing top and bottom edges; an interior facing surface and an exterior facing surface, and plural curvilinear corner portions, and each of the plural curvilinear corner portions define a radius and structurally interconnects adjacent side edges of the generally planer front side, the generally planer rear side, the generally planer first lateral side and the generally planer second lateral side, and a top having plural opposing and spaced apart edge portions, and the plural opposing and spaced apart edge portions of the top are structurally interconnected to the top edges of the generally planer front side, the generally planer rear side, the generally planer first lateral side and the generally planer second lateral side, and a bottom having plural opposing and spaced apart edge portions, and the plural opposing and spaced apart edge portions of the bottom are structurally interconnected to the bottom edges of the generally planer front side, the generally planer rear side, the generally planer first lateral side and the generally planer second lateral side; and a tap coupler anchor structurally carried by the generally rectilinear body on one of the generally planar front side, or the generally planar rear side, or the generally planar first lateral side, or the generally planar second lateral side the tap coupler anchor defining a spear hole that communicates with the interior volume of the generally rectilinear body and the spear hole defines an axis that extends into the interior volume of the generally rectilinear body.

In an even still further aspect, threads (not shown), or other known releasable attachment structures, are carried by and defined by the tap coupler anchor, on an internal or external surface thereof, to releasably engage with a removable cap (not shown) to releasably fluidically (fluid-tight and air-tight) seal the spear hole.

In an even still further aspect, the tap coupler anchor is structurally carried on one generally planer side of the body and an axis of a spear hole defined by the tap coupler anchor extends perpendicular from the one generally planar side of the body toward the opposing generally planar side of the body.

BRIEF DESCRIPTION OF THE SEVERAL VIEWS OF THE DRAWINGS

Specific forms, configurations, embodiments and/or diagrams relating to and helping to describe preferred embodiments of my invention are explained and characterized herein, often with reference to the accompanying drawings. The drawings and all features shown therein also serve as part of the disclosure of my invention, whether described in the text or merely by graphical disclosure alone. Such drawings are briefly described below.

DETAILED DESCRIPTION OF THE PREFERRED EMBODIMENTS

Figure 1:
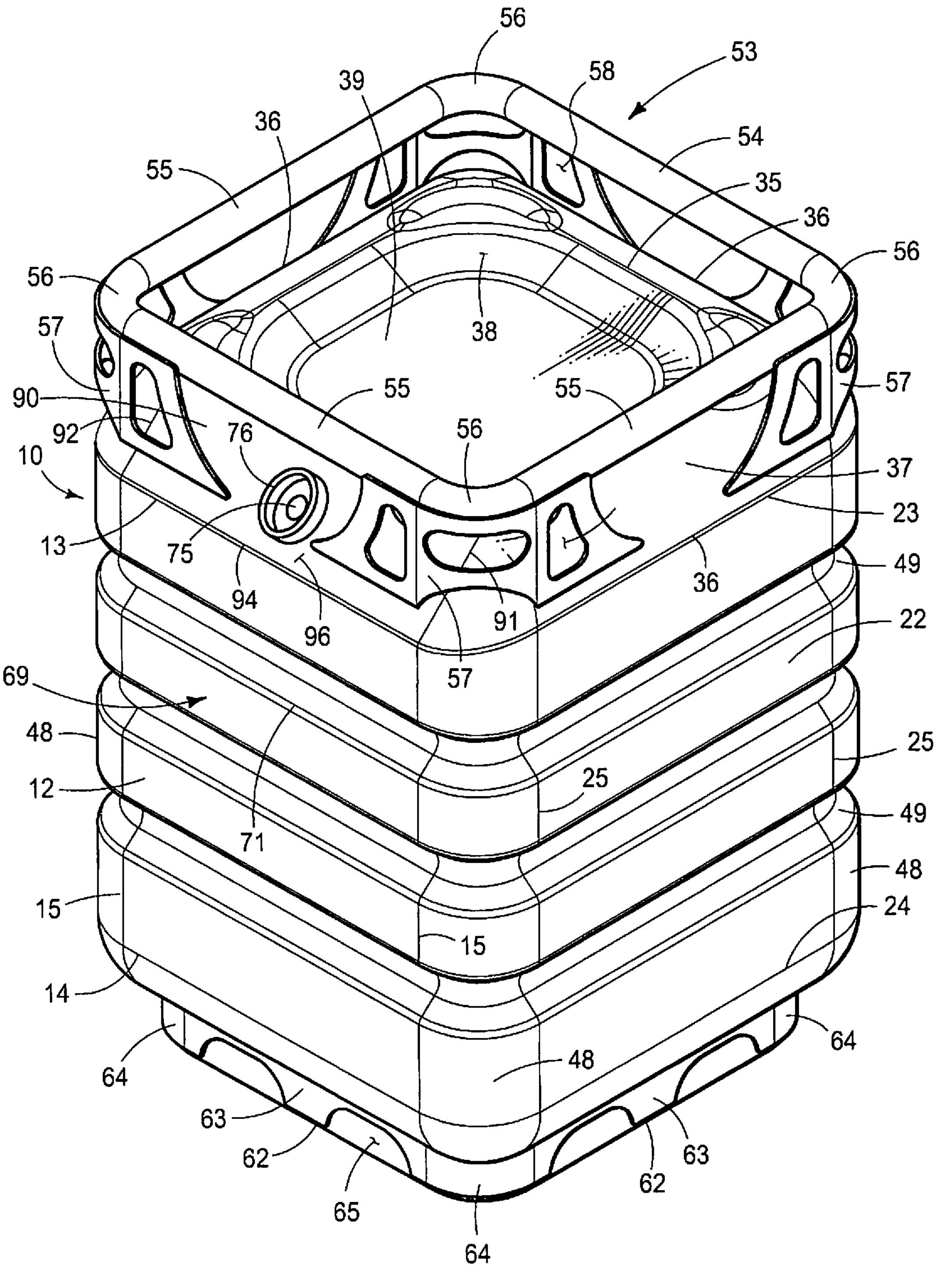
FIG. 1 is a perspective front side, first lateral side and top view of my container for storing, transporting and dispensing a beverage.
Figure 2:
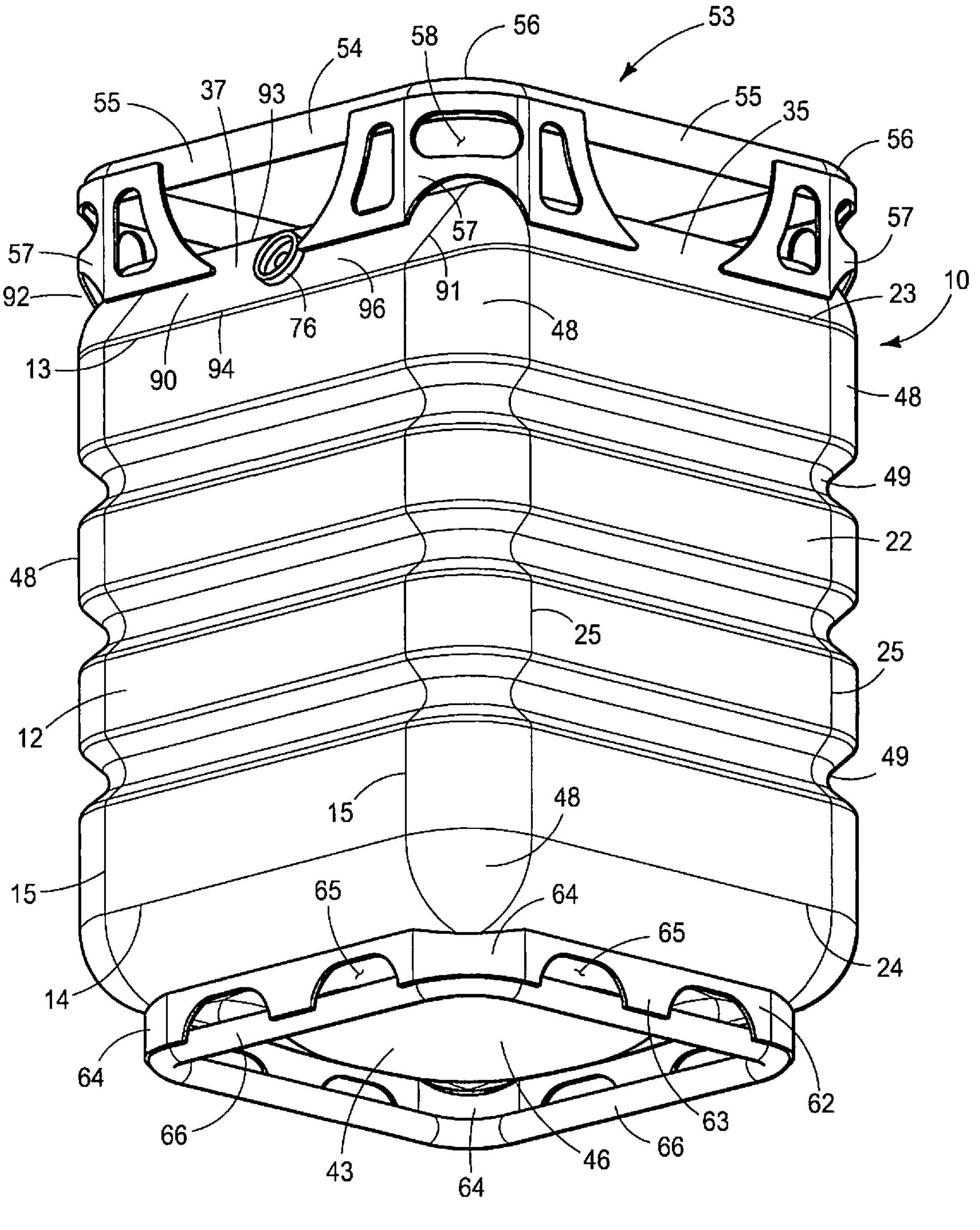
FIG. 2 is a perspective front side, first lateral side and bottom view thereof.

A container for storing, transporting and dispensing a beverage generally provides a body 10, and a tap coupler anchor 76.

The body 10 is preferably formed of stainless steel and is generally rectilinear in peripheral configuration and defines an interior volume 11 for a fluid tight containment of the fluidic beverage. (not shown). The body 10 has an exterior facing surface 89, an interior facing surface 88 within the interior volume 11, and further defines a vertical axis 85, a side-to-side X-axis 86, and a front-to-rear Y-axis 87.

The body 10 has a generally planar front side 12 that has a top edge 13, a spaced apart and opposing bottom edge 14 and two spaced apart opposing and parallel side edges 15. The body 10 further has a generally planar rear side 16 that has a top edge 17, a spaced apart and opposing bottom edge 18 and two spaced apart opposing and parallel side edges 19. The body 10 still further has a generally planar first lateral side 22 that has a top edge 23, a spaced apart and opposing bottom edge 24 and two spaced apart opposing and parallel side edges 25. The body 10 even still further has a generally planar second lateral side 29 that has a top edge 30, a spaced apart and opposing bottom edge 31 and two spaced apart opposing and parallel side edges 32. As noted previously, each of the front side 12, rear side 16, first lateral side 22 and second lateral side 29 are preferably formed of stainless steel.

Plural curvilinear corner portions 48 structurally interconnect adjacent side edge portions 15, 19, 25, 32 of the front side 12, rear side 16, first lateral side 22 and second lateral side 29, respectively, so as to form the generally rectilinear configuration of the body 10. Each of the plural curvilinear corner portions 48 defines a radius 50. The radius 50 of each of the plural curvilinear corner portions provides structural integrity to the body 10 which must maintain an internally pressurized condition. As is known, curvilinear corner portions 48 defining a radius 50 are structurally stronger than angular corners.

A top 35 having plural opposing and spaced apart edge portions 36, a perimeter portion 37, an inwardly/downwardly angled portion 38 and a concavely/downwardly protruding center portion 39 is structurally interconnected to the top edges 13, 17, 23, 30 of the front side 12, rear side 16, first lateral side 22 and the second lateral side 29 and to the plural curvilinear corner portions 48 so as to form the top 35 of the body 10. Similar to the body 10, the top 35 is preferably also formed of stainless steel. The concavely downwardly protruding center portion 39 provides structural integrity to the body 10 and reduces the surface area of the beverage with in the interior volume 11 that is exposed to gases/air (not shown) when the interior volume 11 is filled with a beverage by concentrating the gasses/air to the upper periphery of the interior volume 11.

Figure 7:
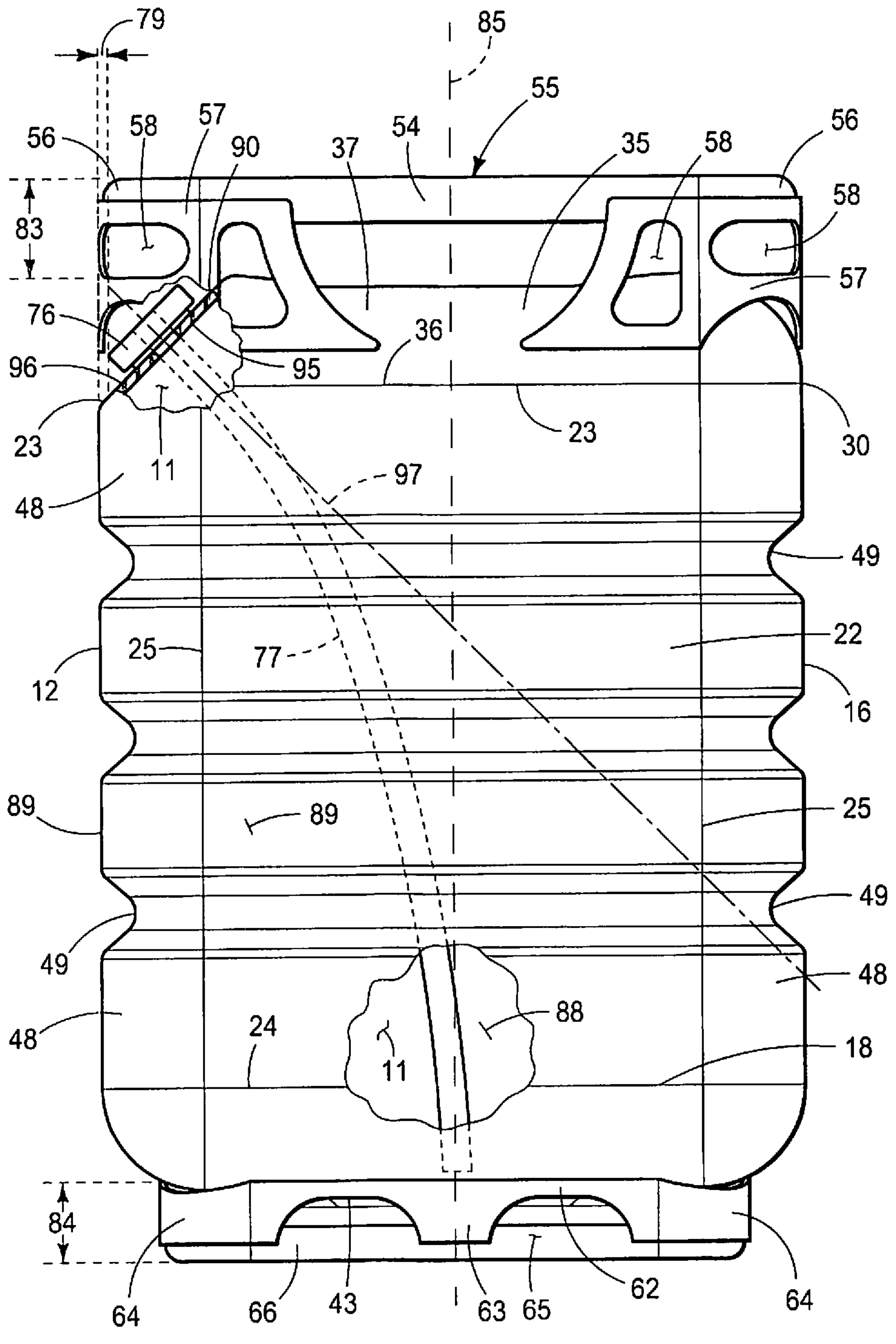
FIG. 7 is an orthographic, partial cutaway, first lateral side view of my container showing the tap coupler anchor, a tap spear, the interior volume of the container, the interior facing surface, and the axis of the spear hole.

A bottom 43 having plural opposing and spaced apart edge portions 44, a perimeter portion 45, and a convexly/downwardly protruding center portion 46 is structurally interconnected to the bottom edges 14, 18, 24, 31 of the front side 12, rear side 16, first lateral side 22 and the second lateral side 29 and to the plural curvilinear corner portions 48 so as to form the bottom 43 of the body 10. Similar to the body 10 and the top 35, the bottom 43 is preferably also formed of stainless steel. The convexly downwardly protruding center portion 46 provides structural integrity to the body 10 and further allows all of the beverage within the interior volume 11 to collect at the lowest point within the interior volume 11 so that all of the beverage may be collected/dispersed by the tap spear assembly 77 extending into the interior volume 11. (FIG. 7).

The described generally rectilinear configuration provides the body 10 with an exterior side to side dimension 80 that is equal between the exterior facing surfaces 89 of the first lateral side 22 and the second lateral side 29, and between the exterior facing surfaces 89 of the front side 12 and the rear side 16. The dimension 80 allows the "footprint" of the body 10 to be easily calculated so as to determine how many bodies 10 will fit within a refrigerated area, such as, but not limited to, and under counter cooler or transport vehicle.

Figure 10:
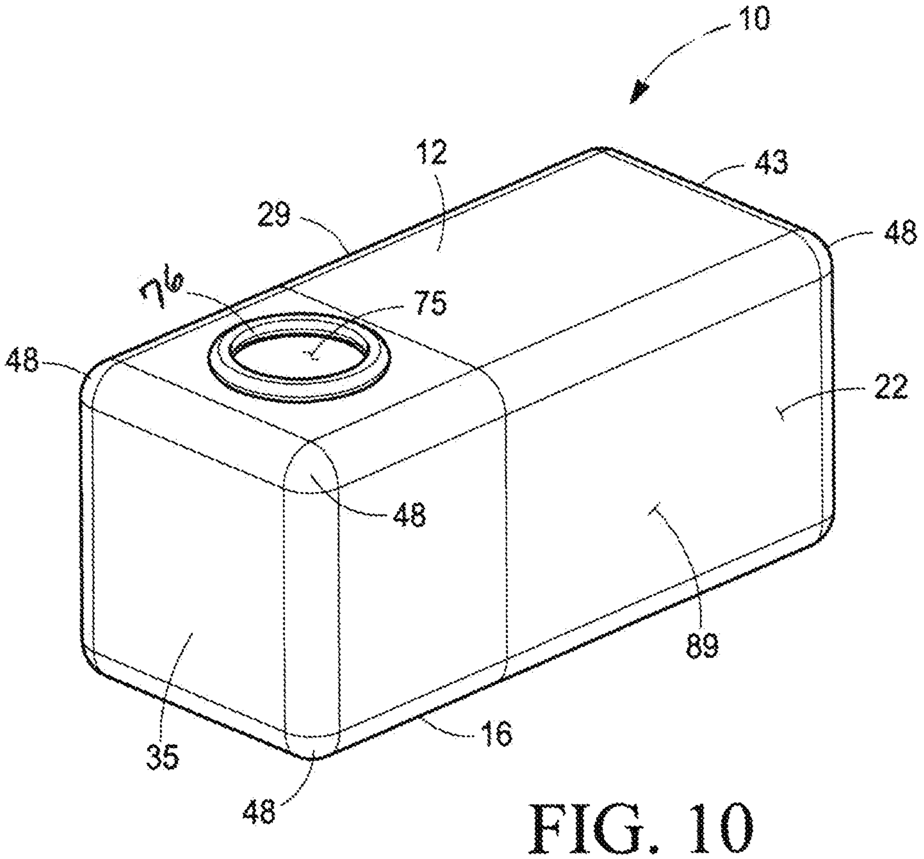
FIG. 10 is a perspective first lateral side, front side and top view of a fourth possible embodiment of my invention shown lying on its rear side.
Figure 11:
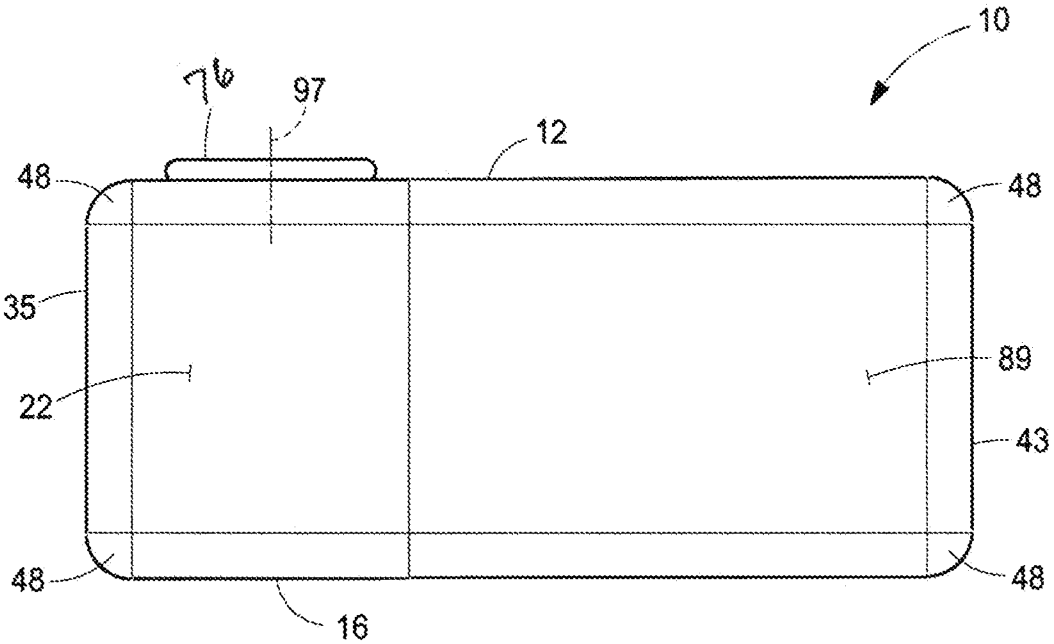
FIG. 11 is an orthographic first lateral side view of the container of FIG. 10.

At least one and perhaps plural concave and inwardly protruding annular depressions 49 may be defined in the body 10 and may be spacedly arrayed between the top 35 and the bottom 43, with a vertical distance 52 between each of the concave and inwardly protruding annular depressions 48. The depressions 49 extend annularly about the body 10 and provide structural rigidity and integrity to the body 10. The number and spacing of the annular depressions 49 is dependent upon the size of the container. For example, only, a full size keg might define three concave and inwardly protruding annular depressions 49, while a "pony keg" or "half keg" might define only one concave and inwardly protruding annular depression 49 and an even smaller keg container may have no inwardly protruding annular depressions. (FIGS. 10 and 11).

A top handle 53 is structurally interconnected to the body 10 at the top 35 of the body 10. The top handle 53 has a tubular handle rail 54 that is comprised of plural spaced apart side portions 55, and each of the plural spaced apart side portions 55 has opposing ends, and plural handle rail corner portions 56 structurally interconnect adjacent ends of the plural spaced apart side portions 55 to form the generally rectilinear handle rail 54. Plural handle supports 57 structurally interconnect and extend between the tubular handle rail 54 and the top of 35 of the body 10. In the preferred embodiment, the plural handle supports 57 are each somewhat arcuate in configuration and interconnect the tubular handle rail 54 and the body 10 at the handle corner portions 56 of the top handle 53 and at the curvilinear corner portions 48 of the body 10. In the preferred embodiment, the handle supports 57 may define cutouts 58. The cutouts 58 facilitate airflow around and about the body 10 and also to prevent the retention of fluids, such as water when the body 10 is being cleaned/washed, and also to prevent accumulation of ice when the body 10 is exposed to freezing conditions.

Figure 5:
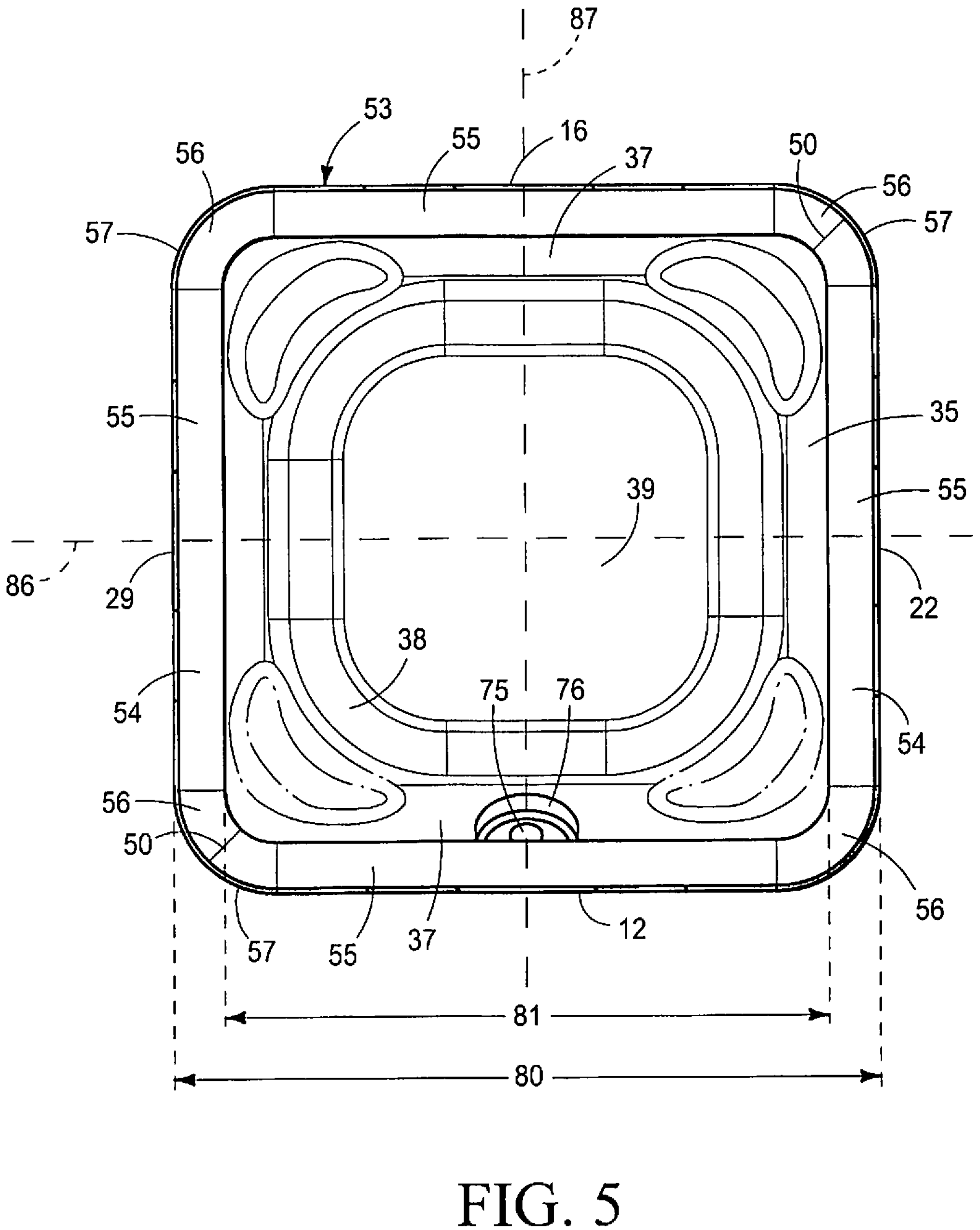
FIG. 5 is an orthographic top, downward looking view, thereof.

The top handle 53, and more precisely the tubular handle rail 54 is spaced above the top of 35 of the body by a dimension identified by 83 (FIG. 5) and the tubular handle rail 54 defines a predetermined interior side to side dimension 81. (FIG. 5). The height dimension 83, and the interior side to side dimension 81 facilitate secure vertical stacking of bodies 10 on top of one another as described hereafter.

As shown in the Figures, the top handle 53 has a peripheral configuration that is similar to the top periphery of the body 10. This particular configuration is not essential and other configurations of the top handle 53 are contemplated, such as, but not limited to including a recess (not shown) or setback (not shown) to provide better access to the tap coupler anchor 76 and associated beverage plumbing apparatus. (not shown) and for smaller kegs, such as, but not limited to "growler size kegs" there may be no top handle 53 at all.

Figure 4:
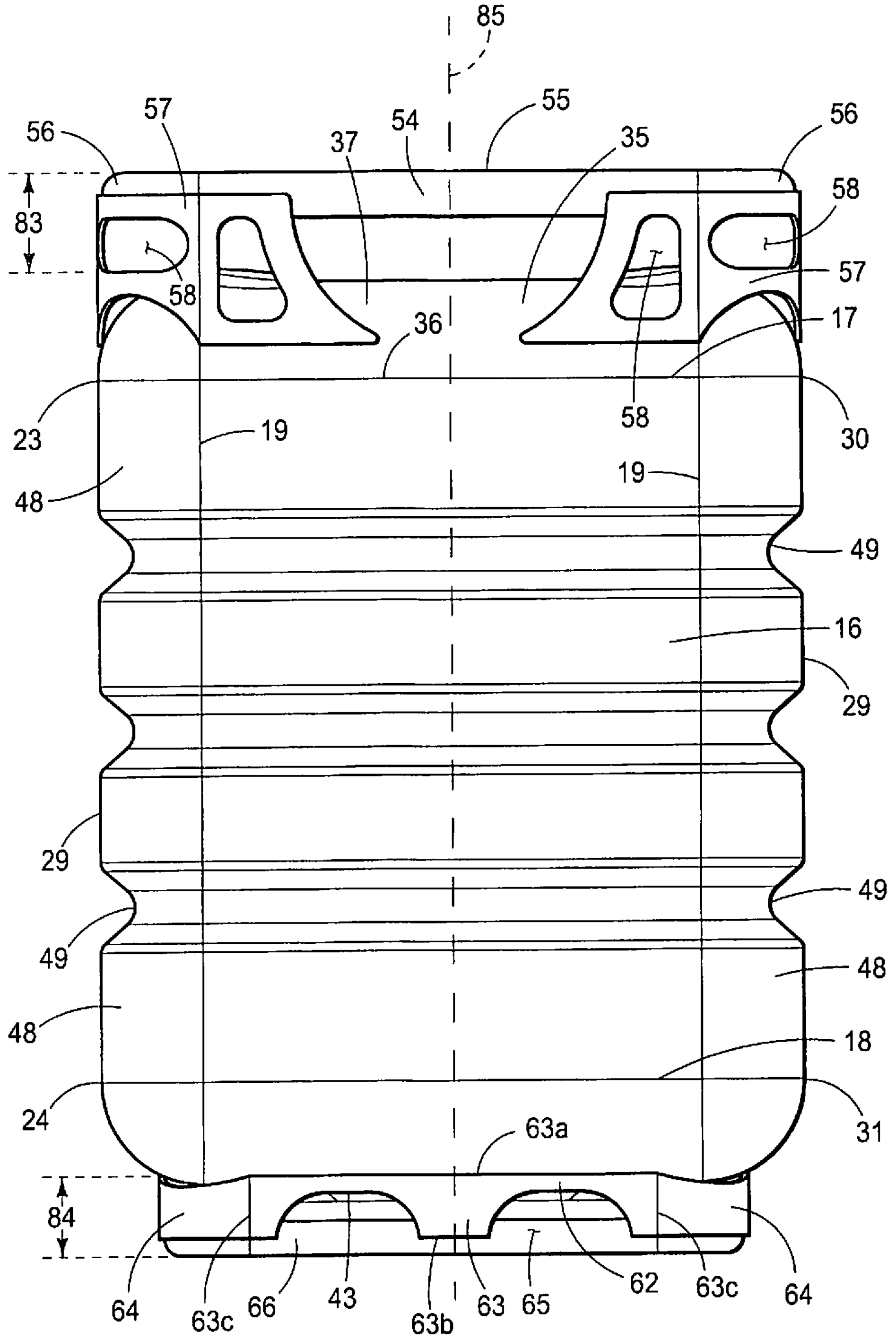
FIG. 4 is an orthographic rear side view thereof.

A bottom flange 62 (FIG. 4) is structurally interconnected to the body 10 proximate to the bottom 43. The bottom flange 62 has plural spaced apart side portions 63, and each of the plural side portions 63 has a top edge 63*a* and a bottom edge 63*b* and two spaced apart end portions 63*c*. The bottom flange 62 further has plural corner portions 64 that structurally interconnect adjacent end portions 63*c* of the side portions 63 of the bottom flange 62. A tubular bottom rail 66 is structurally carried at the bottom edges 63*b* of the side portions 63 to form a supporting base for the body 10. The plural side portions 63 may define cutouts 65 to facilitate airflow around and about the body 10 and also to prevent the retention of fluids, such as water when the body 10 is being cleaned/washed, and also to prevent accumulation of ice when the body 10 is exposed to freezing conditions.

Figure 6:
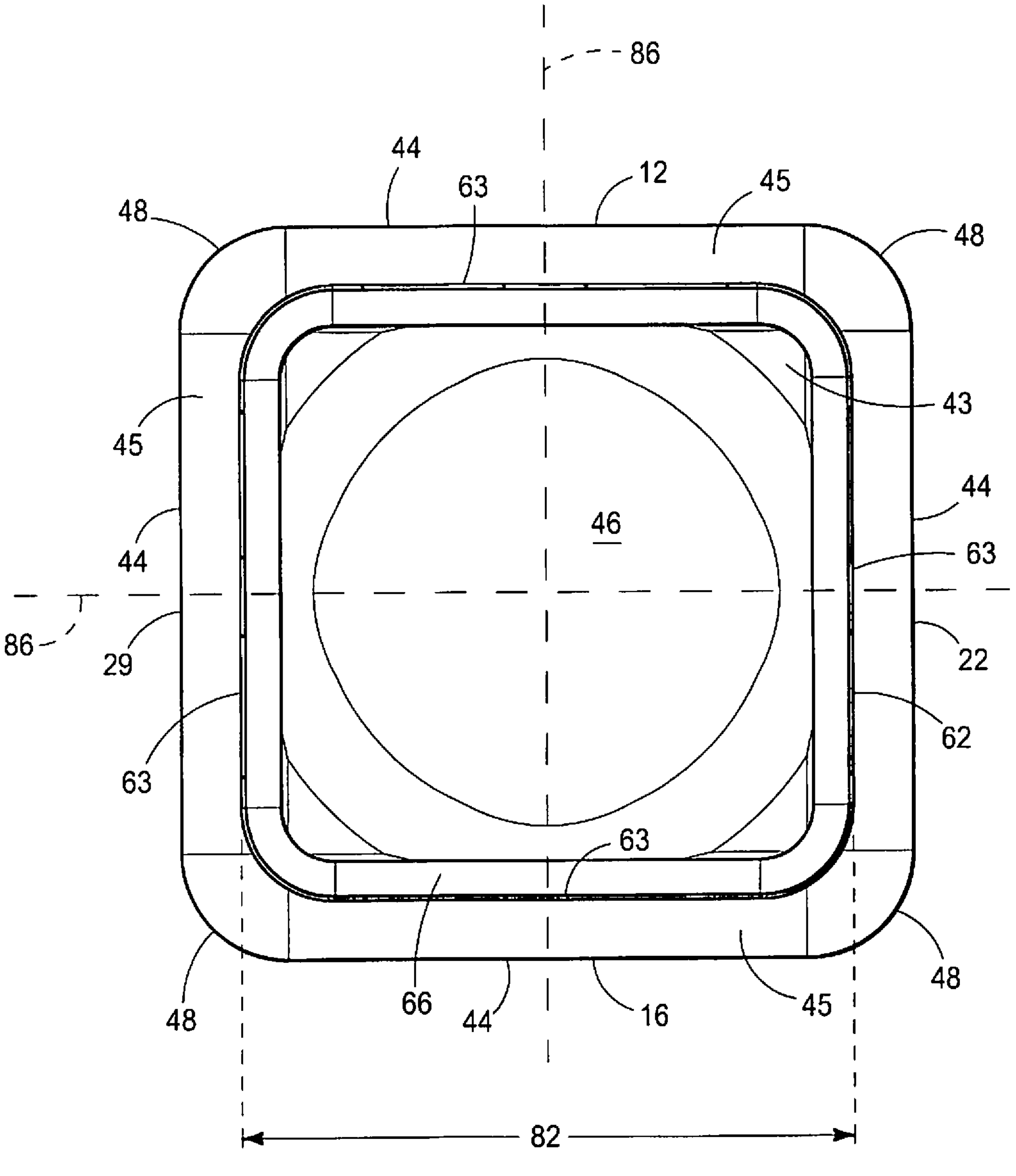
FIG. 6 is an orthographic bottom, upward looking view, thereof.

The bottom flange 62 defines an exterior side to side dimension 82 (FIG. 6), and a height dimension 84. (FIG. 7). The exterior side to side dimension 82, and the height dimension 84 of the bottom flange 62 are both less than the interior side to side dimension 81, and height dimension 83 of the top handle 53, so that the bottom flange 62 axially fits within the top handle 53 to facilitate secure vertical stacking of bodies 10. As noted previously, if the configuration of the top handle 53 is a configuration other than the peripheral edge of the top 35, the configuration of the bottom flange 62 should generally be similar in configuration of the top handle 53 to facilitate secure vertical stacking of plural bodies 10.

A tap coupler anchor 76 is structurally carried by the body 10. A spear hole 75 is defined by the tap coupler anchor 76 and the spear hole 75 communicates with the interior volume 11 of the body 10. A dispensing coupler 78 (FIG. 9) and a known spear assembly 77 (FIG. 7) releasably engage with the tap coupler anchor 76 and provide a means for extracting/dispensing the beverage (not shown) contained within the interior volume 11 of the body 10. The spear hole 75 defines an axis 97 (FIG. 7) that extends inwardly and downwardly into the interior volume 11. The spear hole axis 97 is not vertical because the spear hole 75 is not defined in the top 35 of the body 10. Instead, placement of the spear hole 75, and tap coupler anchor 76 at a position other than the top 35 requires that the spear assembly 77 be somewhat angulated to reach the interior center bottom of the interior volume 11, and further allows plural bodies 10 to be stacked on top of one another while maintaining access to the tap coupler anchor 76 for interconnection with a dispensing coupler 78 to facilitate removal of the beverage from within the interior volume 11. The tap coupler anchor 76 may define/carry threads (not shown), or other releasable engagement structures, on an interior surface and/or exterior surface thereof to releasably engage with a removable cap/seal (not shown) that is fluid-tight, and air-tight, that is releasably interconnected to threads to prevent leakage of the beverage from within the interior volume 11 and to preserve the quality of the beverage within the interior volume 11.

Placement of the tap coupler anchor 76 as described herein, also allows plural bodies 10 to be placed in close, and even direct/immediate adjacency to one another during use, transport, storage and dispensing, while maintaining access to the tap coupler anchor 76. Such close placement of bodies 10 maximizes available space within a cooler or transport means or storage facility. The dispensing coupler 78 releasably engages with the tap coupler anchor 76 in a fluid-tight and air-tight engagement therewith, so that a compressed gas, such as, but not limited to, air or Carbon Di-Oxide ($CO_2$), or Nitrogen ($N_2$), may be injected into the interior volume 11 while simultaneously, the beverage (not shown) contained within the interior volume 11 is forced outwardly through the spear assembly 77, through the spear hole 75 and into and through the dispensing coupler 78.

Figure 3:
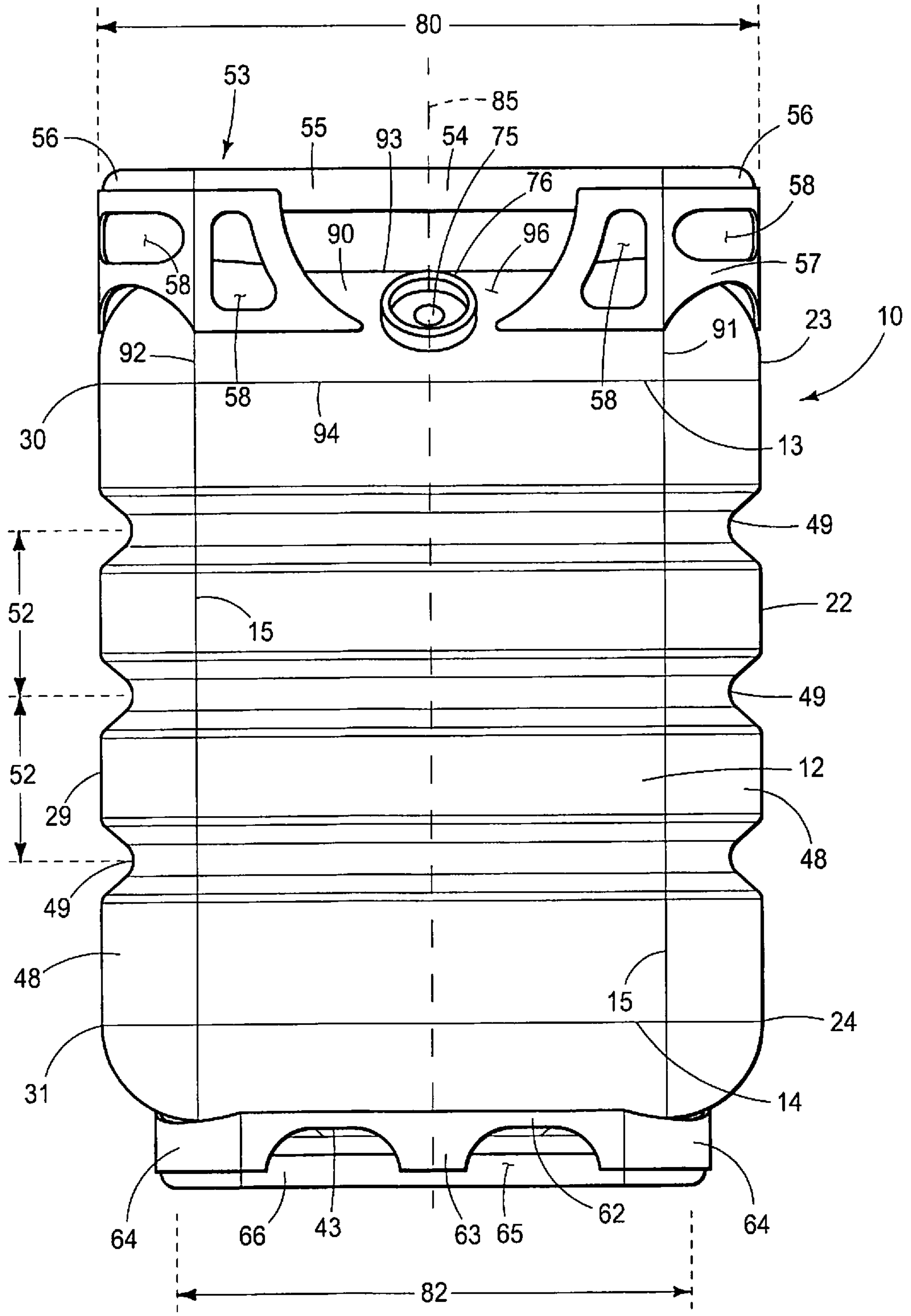
FIG. 3 is an orthographic front side view thereof.

As best shown in FIGS. 1, 3 and 7, the body 10 defines an angulated tap face 90 that has an exterior facing surface 96, an interior facing surface 95, a bottom edge portion 94 that structurally communicates with a top edge 13, 17, 23, 30 of the generally planar side 12, 16, 22, 29 and a top edge portion 93 that structurally communicates with one edge 36 of the top 35, and a first end 91 and a second end 92. The angulated tap face 90 causes the tap coupler anchor 76 to be set back a distance 79 from the exterior facing surface 89 of the generally planar side 12, 16, 22, 29 and also to be set back from the top handle 53. The angulated tap face 90 protects the tap coupler anchor 76 and the dispensing coupler 78 connected therewith. Further still, the setback 79 allows a plurality of bodies 10 to be positioned immediately adjacent one another without interfering with the tap coupler anchor 76 while maintaining access thereto. Even further yet, as shown in FIG. 7, when the body 10 is inverted, such as for cleaning, the interior facing surface 95 of the angulated tap face 90 is the bottom/lowest point of the interior volume 11, so that cleaning fluids, such as soapy water that may be injected into the interior volume 11 for cleaning purposes, can be completely drained from the interior volume 11 prior to reuse of the body 10 and refilling of the interior volume 11.

Figure 8:
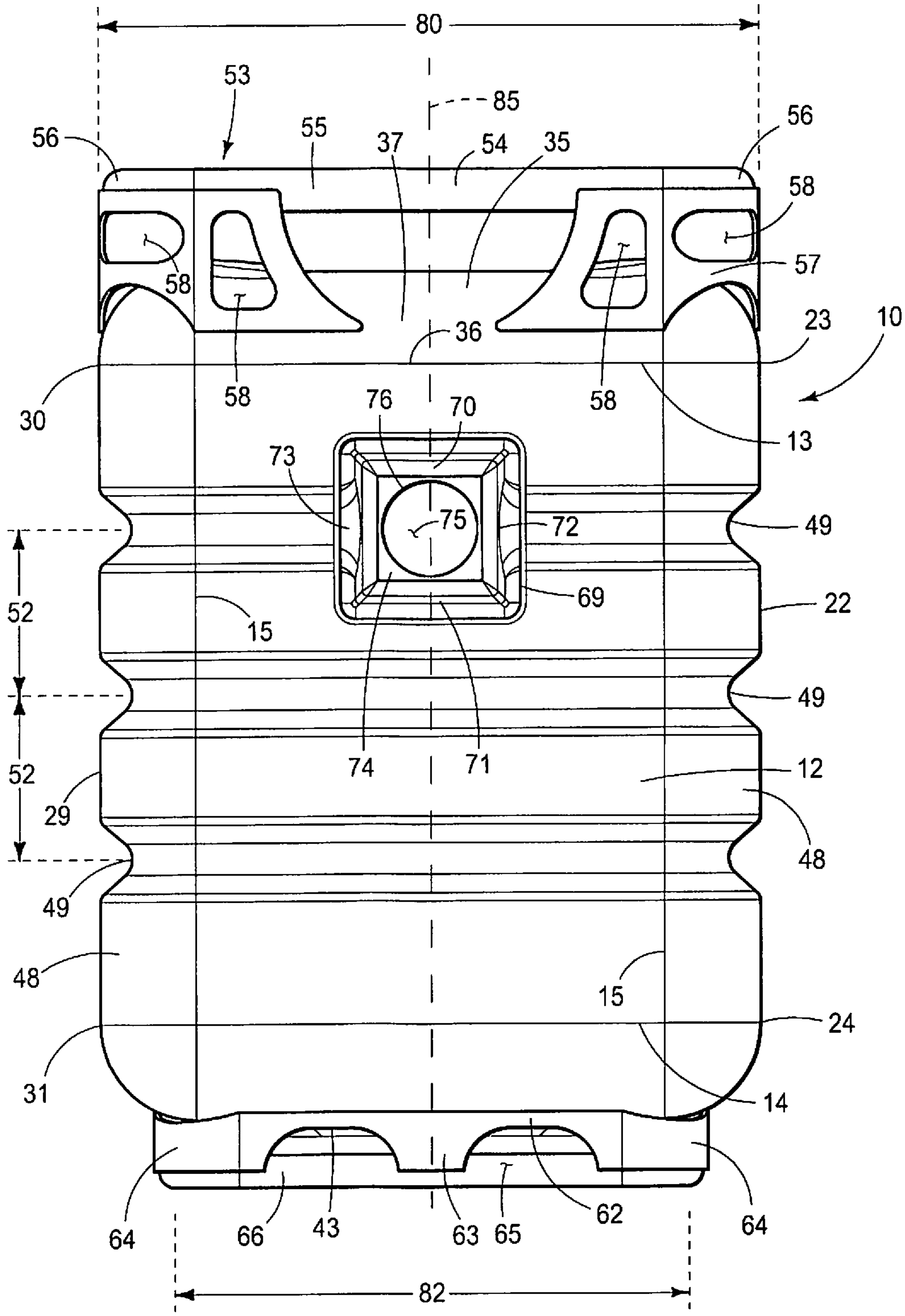
FIG. 8 is an orthographic front side view of my container showing a second possible embodiment with the tap coupler anchor carried within a tap recess defined in the generally planar front side.

As shown in FIG. 8, in a second possible embodiment, a tap recess 69 may be defined in one of the generally planar sides of the body 10, such as in, but not limited to, the front side 12, spacedly below the top 35. The tap recess 69 protrudes inwardly from the exterior facing surface 89 into the interior volume 11. The tap recess 69 has a top portion 70, a bottom portion 71, a first side portion 72, a second side portion 73 and a base portion 74. Adjacent edges of the top portion 70, the bottom portion 71, the first side portion 72, the second side portion 73 and the base portion 74 are structurally interconnected in a fluid-tight arrangement, such as by welding. Edge portions of the top portion 70, bottom portion 71, first side portion 72 and second side portion 73, opposite the base portion 74, are structurally interconnected to the interior facing surface 88 of the adjacent generally planar side 12, 16, 22, 29 so that the base portion 74 is "setback" from the exterior facing surface 89 and into the interior volume 11. In this second possible embodiment, the tap coupler anchor 76 which defines the spear hole 75 is structurally carried by the base portion 74, at a generally medial position thereon. The spear hole 75 defined in the base portion 74 communicates with the interior volume 11 of the body 10. In this second possible embodiment, the tap coupler anchor 76 is similarly protected by being set back from the exterior facing surface 89, and is therefore less subject to being damaged by dropping of the body 10, and further the setback allows closely adjacent positioning/placement of plural bodies 10.

Figure 9:
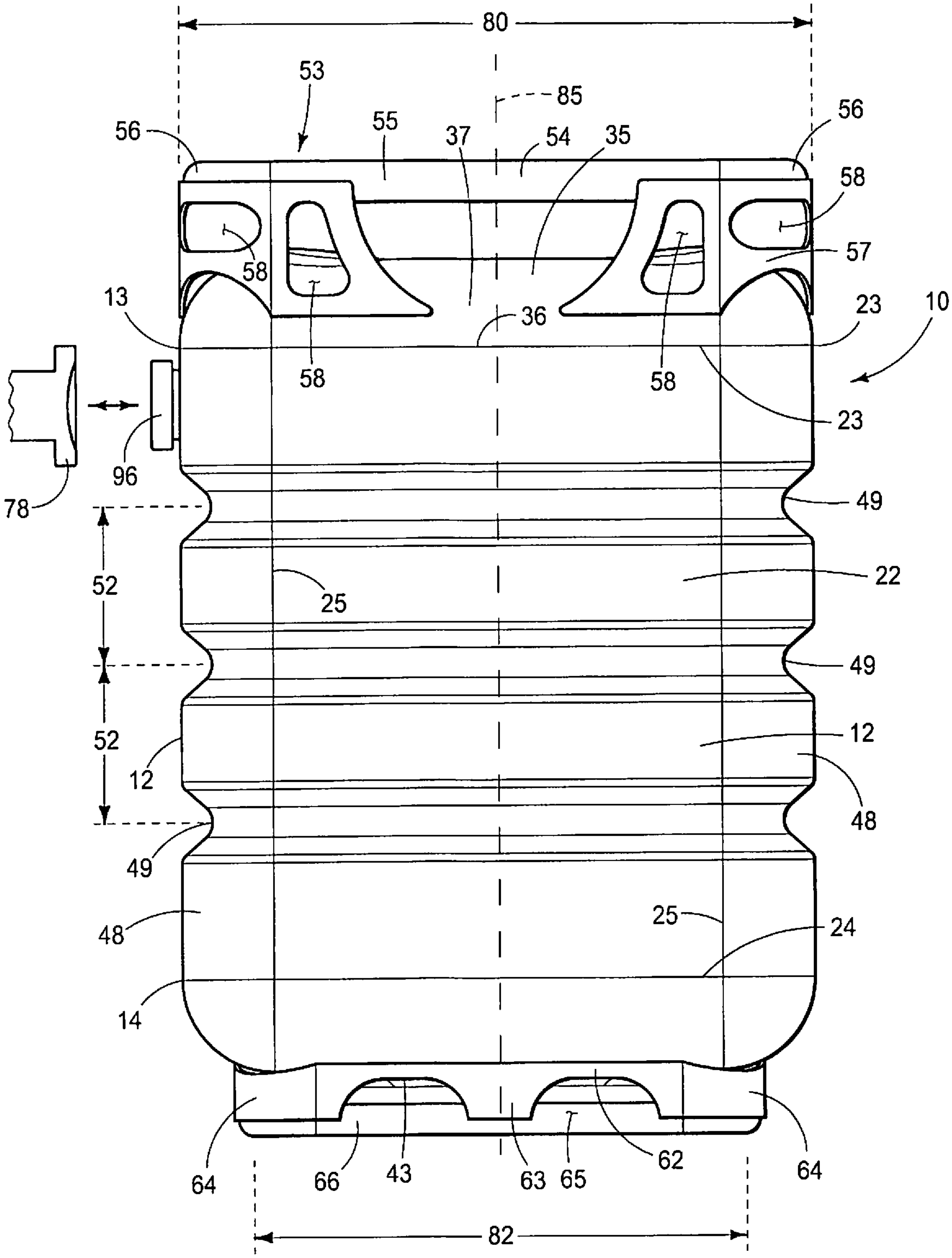
FIG. 9 is an orthographic first lateral side view of a third possible embodiment of my invention showing the tap coupler anchor extending laterally outwardly from the generally planar front side.

As shown in FIG. 9, in a third possible embodiment, the tap coupler anchor 76 is structurally interconnected to the exterior facing surface 89 of one of the generally planar sides 12, 16, 22, 29 such as, but not limited to, the front side 12 and is not horizontally setback thereon, but rather extends generally laterally outwardly therefrom. Similar to the preferred embodiment, and the second possible embodiment, discussed above, the tap coupler anchor 76 defines a spear hole 75 that communicates with the interior volume 11 of the body 10. Further, similar to the first preferred embodiment, when the body 10 is inverted, such as for cleaning, the externally mounted tap coupler anchor 76 (FIG. 9) is the bottom/lowest point on the interior facing surface 88 of the interior volume 11 of the body 10 so that cleaning fluids may be completely and totally removed from the interior volume 11 prior to refilling the interior volume 11 with a beverage.

As shown in FIGS. 10 and 11, in a fourth possible embodiment, the tap coupler anchor 76 is structurally interconnected to the exterior facing surface 89 of one of the generally planar sides 12, 16, 22, 29 such as, but not limited to, the front side 12 and is not horizontally setback thereon, but rather extends generally laterally outwardly therefrom. Similar to the preferred embodiment, and the second and third possible embodiments, discussed above, the tap coupler anchor 76 defines a spear hole 75 that communicates with the interior volume 11 of the body 10. Further, similar to the first preferred embodiment, when the body 10 is inverted, such as for cleaning, the externally mounted tap coupler anchor 76 (FIGS. 10, 11) is the bottom/lowest point on the interior facing surface 88 of the interior volume 11 of the body 10 so that cleaning fluids may be completely and totally removed from the interior volume 11 prior to refilling the interior volume 11 with a beverage. The body 10 in the embodiment shown in FIGS. 10 and 11 is intended to be "growler size" (approximately 1 US Gallon) and therefore no top handle 53 and no bottom flange 62 is necessary, and no inwardly protruding annular depressions 49 are necessary. In the embodiment shown in FIG. 10, it is contemplated the body 10 may be rested (during operation/dispensing/storage) on the rear side 16 with the top 13 and bottom 14 oriented as ends of the elongated body 10. Such a configuration allows the body 10 to be stored/placed within a standard transportable picnic cooler (not shown) perhaps with ice placed on top, (allowing room for food thereover) and/or placed on the shelf of a residential refrigerator (not shown). A self-contained tap assembly (not shown) that may have its own source of pressurized air/gas may be interconnected to the tap coupler anchor 76 to dispense the beverage from the interior volume 11.

In a still further embodiment, (not shown) it is contemplated that a flexible bag-like liner (not shown) may be inserted into the interior volume 11 through the spear hole 75, and the interior of the bag-like liner fluidically contains the beverage. In this still further embodiment, the bag-like liner would be removed and replaced with every refilling of the interior volume 11 with beverage. In this even still further embodiment, the body 11 provides the structural rigidity for the container while the bag-like liner provides fluid containment and sanitary conditions for the beverage.

Operation

The operation of the described embodiment of the present invention is believed to be readily apparent, and is briefly summarized at this point.

In its broadest aspect, the present invention relates to a container for storing, transporting and dispensing a beverage and comprises a container for storing, shipping and dispensing a bulk quantity of beverage comprises: a generally rectilinear stainless steel body 10 defining an interior volume 11, the generally rectilinear body 10 having, a front side 12, a rear side 16, a first lateral side 22 and a second lateral side 29, each of the front side 12, the rear side 16, the first lateral side 22 and the second lateral side 29 having spaced apart opposing side edges 15, 25, 32, 36 spaced apart opposing top edges 13, 17, 23, 30 and bottom edges 14, 18, 24, 31 an interior facing surface 88 and an exterior facing surface 89; and plural curvilinear corner portions 48, each curvilinear corner portion 48 defines a radius 50 and structurally interconnects the adjacent side edges 15, 25, 32, 36 of the front side 12, the rear side 16, the first lateral side 22 and the second lateral side 29 so as to form the generally rectilinear stainless steel body 10; and a generally planar top 35 having plural opposing and spaced apart edge portions 36, and the plural opposing and spaced apart edge portions 36 of the top 35 are structurally interconnected to the top edges 13, 17, 23, 30 of the front side 12, the rear side 16, the first lateral side 22, the second lateral side 29 and the plural curvilinear corner portions 48 so as to form the top 35 of the generally rectilinear stainless steel body 10; and a generally planar bottom 43 having plural opposing and spaced apart edge portions 44, and the plural opposing and spaced apart edge portions 44 of the bottom 43 are structurally interconnected to the bottom edges 14, 18, 24, 31 of the front side 12, the rear side 16, the first lateral side 22, the second lateral side 29 and the plural curvilinear corner portions 48 so as to form the bottom 43 of the generally rectilinear stainless steel body 10; and a concave and inwardly protruding annular depression 49 defined in the generally rectilinear body 10, the concave and inwardly protruding annular depression 49 extending circumferentially about the generally rectilinear body 10 spacedly between the top 35 and bottom 43 of the generally rectilinear body 10; a top handle 53 structurally interconnected to the generally rectilinear body 10 at the top 35 of the generally rectilinear body 10, the top handle 53 having a tubular handle rail 54 with plural spaced apart side portions 55, each tubular handle rail side portion 55 having two opposing ends, and plural handle rail corner portions 56 structurally interconnecting adjacent ends of the plural tubular handle rail side portions 55 of the tubular handle rail 54 so as to form the top handle 53, and plural handle supports 57, each of the plural handle supports 57 having a top edge, a bottom edge and two opposing end portions, and each top handle support 57 structurally interconnects, at the top edge thereof, with one of the plural handle rail corner portions 56 of the top handle 53, and the bottom edge is structurally interconnected with the generally rectilinear body 10 at the top 35 of the generally rectilinear body 10, each of the plural top handle supports 57 defining a cutout 58, and the plural top handle supports 57 position the top handle 53 spacedly above the top 35 of the generally rectilinear body 10; a bottom flange 62 structurally interconnected to the generally rectilinear body 10 at the bottom 43 of the generally rectilinear body 10, the bottom flange 62 having, plural spaced apart side portions 63, each side portion 63 having a top edge 63*a* and a bottom edge 63*b* and two opposing and spaced apart end portions 63*c*, and plural corner portions 64, each of the plural corner portions 64 structurally interconnecting adjacent end portions 63*c* of each side portion 63 of the bottom flange 62, and the top edge 63*a* of each of the plural bottom flange side portions 63 is structurally interconnected to the bottom 43 of the generally rectilinear body 10, and a tubular bottom rail 66 structurally interconnected to the bottom edge 63*b* of each bottom edge flange side portion 63 and a bottom edge of each of the plural bottom flange corner portions 64; and a distance 82 dimension between exterior facing surfaces of diametrically opposing side portions 63 of the bottom flange 62 is smaller than a distance dimension 81 between interior facing surfaces of diametrically opposing side portions 55 of the top handle 53 so that the bottom flange 62 of the generally rectilinear body 10 axially fits within the top handle 53 of a second generally rectilinear body 10 to facilitate vertical stacking of plural generally rectilinear bodies 10; and an angulated tap face 90 that structurally communicates between the top edge 13, 17, 23, 30 of one generally planar side 12, 16, 22, 29 and an adjacent edge 36 of the top 35, and the angulated tap face 90 carries the tap coupler anchor 76 and defines the spear hole 75 communicating with the interior volume 11 of the generally rectilinear body 10 to allow a tap spear 77 to be at least partially inserted into the interior volume 11, and the tap coupler anchor 76 releasably engages with a dispensing coupler 78 which fluidically communicates with the spear hole 75 so as to dispense the beverage from within the interior volume 11 of the generally rectilinear body 10 and a setback 79 of the tap coupler anchor 76 from the exterior surface 89 of the body 10 and the angulated tap face 90 allows vertically stacked bodies 10 to be tapped and interconnected to a dispensing coupler 78 to allow beverage to be dispensed from within the interior cavity 11 while plural bodies 10 are vertically stacked one on top of another.

In a further aspect, in the present invention, the tap coupler anchor 78 is structurally carried on one generally planer side 12, 16, 22, 29 of the body 10, and an axis 97 of a spear hole 75, defined by the tap coupler anchor 78, extends perpendicular from the one generally planar side 12, 16, 22, 29 of the body 10 toward the opposing generally planar side 12, 16, 22, 29 of the body 10.

In an even further aspect, the present invention provides a container for storing, shipping and dispensing a bulk quantity of beverage comprising: a generally rectilinear stainless steel body 10 defining an interior volume 11, the generally rectilinear body 10 having, a generally planer front side 12, a generally planer rear side 16, a generally planer first lateral side 22 and a generally planer second lateral side 29, each of the generally planer front side 12, the generally planer rear side 16, the generally planer first lateral side 22 and the generally planer second lateral side 29 having spaced apart opposing side edges 15, 19, 25, 32 spaced apart opposing top 13, 17, 23, 30 and bottom edges 14, 18, 24, 31; an interior facing surface 88 and an exterior facing surface 89, and plural curvilinear corner portions 48, and each of the plural curvilinear corner portions 48 define a radius 50 and structurally interconnects adjacent side edges 15, 19, 25, 32 of the generally planer front side 12, the generally planer rear side 16, the generally planer first lateral side 22 and the generally planer second lateral side 29, and a top 35 having plural opposing and spaced apart edge portions 36, and the plural opposing and spaced apart edge portions 36 of the top 35 are structurally interconnected to the top edges 13, 17, 23, 30 of the generally planer front side 12, the generally planer rear side 16, the generally planer first lateral side 22 and the generally planer second lateral side 29, and a bottom 43 having plural opposing and spaced apart edge portions 44, and the plural opposing and spaced apart edge portions 44 of the bottom 43 are structurally interconnected to the bottom edges 14, 18, 24, 31 of the generally planer front side 12, the generally planer rear side 16, the generally planer first lateral side 22 and the generally planer second lateral side 29; and a tap coupler anchor 76 structurally carried by the generally rectilinear body 10 on one of the generally planar front side 12, or the generally planar rear side 16, or the generally planar first lateral side 22, or the generally planar second lateral side 29, the tap coupler anchor 76 defining a spear hole 75 that communicates with the interior volume 11 of the generally rectilinear body 10 and the spear hole 75 defines an axis 97 that extends into the interior volume 11 of the generally rectilinear body 10.

In a still further aspect, in the present invention, threads (not shown), or other known releasable attachment structures, are carried by and defined by the tap coupler anchor 76, on an internal or external surface thereof, to releasably engage with a removable cap (not shown) to releasably fluidically (fluid-tight and air-tight) seal the spear hole 75.

In use, the body 10 would first be cleaned using known cleaning apparatus which typically require the body 10 to be inverted so that the spear hole 75 that communicates with the interior volume 11 is at the lowest point on the body 10 to facilitate complete gravitational drainage of any cleaning fluids. After cleaning of the interior facing surfaces 89 of the interior volume 11 with an appropriate cleaner such as, but not limited to, soapy water and high temperatures to ensure the sterility and cleanliness, the body would be re-oriented, in an upright orientation with the top 35 vertically above the bottom 43, and the body 10 would be placed in an automated or manual filling station (not shown).

A manual or automated filling apparatus (not shown) communicating with a volume of beverage (not shown) would be fluidically interconnected with the tap coupler anchor 76. A predetermined volume of beverage would be pumped into the interior volume 11 so as to fill the interior volume 11 to a predetermined level which would accommodate thermal expansion and the like. Because of the generally rectilinear configuration of the body 10, the interior volume 11 is approximately 20% to 30% greater than the interior volume of a known cylindrical keg having a dimensional "footprint" of comparable size. After filling of the interior volume 11, the filling apparatus (not shown) would be disconnected from the tap coupler anchor 76. A removable cap/seal (not shown) that is fluid-tight and air-tight is releasably interconnected to threads defined by/carried on the tap coupler anchor 76 to prevent leakage of the beverage from within the interior volume 11 and to preserve the quality of the beverage within the interior volume 11. The and body 10, containing the beverage, would then be placed in a storage facility or transport means that is cooled to a desired temperature.

During storage, and/or during transportation, the peripheral configuration and size of the bottom flange 62, and the peripheral configuration and size of the top handle 53 allows plural bodies 10 to be vertically stacked on top of one another with the bottom flange 62 axially fitting within the top handle 53 to provide for secure vertical stacking. Further, the generally planar side portions 12, 16, 22, 29 allow plural bodies 10 to be placed in immediate adjacency to one another to maximize utilization of available space.

For use, the user fluidically interconnects a dispensing coupler 78 to the tap coupler anchor 76 of the body 10. The setback 79 of the tap coupler anchor 76 from the exterior facing surface 89 of the body 10, allows the container to be "tapped" without needing to "un-stack" the bodies 10 from on top of one another. The dispensing coupler 78 fluidically communicates with plumbing apparatus (not shown) that allows controlled dispensing of the beverage from the interior volume 11. The dispensing coupler 78, in addition to allowing the beverage to flow outwardly through the tap coupler anchor 76 and dispensing coupler 78 may also provide a means for injecting pressurized gas, such as but not limited to, air or carbon di-oxide ($CO_2$), or Nitrogen (N), into the interior volume to facilitate controlled dispensing of the beverage from the interior volume 11.

The use of pressurized gas is to move fluids is well known in the industry and therefore is not described in detail herein.

When the beverage within the interior volume 11 has been completely dispensed, the user would disconnect the dispensing coupler 78 from the tap coupler anchor 76 and reconnect to the dispensing coupler 78 to another body 10 that contains beverage within its interior volume 11. The empty body 10 would thereafter be cleaned and then re-filled for another use.

In compliance with the statute, the invention has been described in language more or less specific as to structural, and methodical features. It is to be understood, however, that the invention is not limited to the specific features shown and described since the means herein disclose comprised preferred forms of putting the invention into effect. The invention is, therefore, claimed in any of its forms or modifications within the proper scope of the appended claims appropriately interpreted in accordance with the Doctrine of Equivalence.

I claim:

1. A container for storing, shipping and dispensing a beverage comprising:
- a generally rectilinear body formed of stainless steel and defining an interior volume, the generally rectilinear stainless steel body having,
  - a generally planar front side, a generally planar rear side, a generally planar first lateral side, and a generally planar second lateral side, and
  - plural curvilinear corner portions, each curvilinear corner portion structurally interconnecting adjacent side edges of the generally planar front side, the generally planar rear side, the generally planar first lateral side and the generally planar second lateral side, and
  - a top structurally interconnected to top edges of the generally planar front side, the generally planar rear side, the generally planar first lateral side and the generally planar second lateral side, and the top is generally horizontal relative to vertical, and
  - a bottom structurally interconnected to bottom edges of the generally planar front side, the generally planar rear side, the generally planar first lateral side and the generally planar second lateral side, and the bottom is generally horizontal relative to vertical; and wherein
- a single spear hole is defined in the generally rectilinear body at a location that is not the top of the generally rectilinear body, and the single spear hole communicates with the interior volume of the generally rectilinear body; and
- a tap coupler anchor is structurally carried by the generally rectilinear body about the single spear hole, and the tap coupler anchor is accessible for interconnection to a dispensing means when plural of the containers for storing, shipping and dispensing a beverage are stacked one on top of another, top to bottom.

2. The container for storing, shipping and dispensing a beverage of claim 1 and wherein the tap coupler anchor is carried at an upper corner portion of the generally rectilinear body, and the upper corner portion of the generally rectilinear body is positioned between and interconnects one of the generally planar sides of the generally rectilinear body and the top of the generally rectilinear body.

3. The container for storing, shipping and dispensing a beverage of claim 1 and further comprising:

an angulated tap face that structurally communicates between the top edge of one generally planar side and an adjacent edge of the top, and the angulated tap face carries the tap coupler anchor and defines the spear hole communicating with the interior volume; and the spear hole defines a spear hole axis that extends downwardly and inwardly into the interior volume of the body and the spear hole axis is not vertical and the spear hole axis is not horizontal.

4. The container for storing, shipping and dispensing a beverage of claim 1 and further comprising:

a tap recess defined in one of the generally planar sides of the generally rectilinear body spacedly below the top of the body and protruding inwardly from the generally planar side into the interior volume, the tap recess carrying the tap anchor at a generally medial position on a base portion of the tap recess, so as to position the tap anchor inward of an exterior facing surface of the generally planar side of the generally rectilinear body.

5. The container for storing, shipping and dispensing a beverage of claim 4 and wherein the tap recess is defined in the generally planar front side of the body and spacedly below the top of the body.

6. The container for storing, shipping and dispensing a beverage of claim 1 and wherein the spear hole defines an axis, and the axis defined by the spear hole is angulated downwardly and inwardly into the interior volume, and the spear hole axis is not vertical, and the spear hole axis is not horizontal.

7. The container for storing, shipping and dispensing a beverage of claim 1 and further comprising:

a top handle structurally interconnected to the body at the top of the body, the top handle having a tubular handle rail with plural spaced apart side portions, each of the tubular handle rail side portions having two opposing ends, and plural handle rail corner portions structurally interconnect adjacent ends of the plural tubular handle rail side portions of the tubular handle rail, and plural top handle supports, each of the plural top handle supports having a top edge, a bottom edge and two opposing end portions, and each top handle support structurally interconnects, at the top edge thereof, with one of the plural handle rail corner portions of the top handle tubular rail, and the bottom edge of each of the plural top handle supports is structurally interconnected with the body at the top of the body, and the plural top handle supports position the top handle spacedly above the top of the body.

8. The container for storing, shipping and dispensing a beverage of claim 1 and further comprising:

a bottom flange structurally interconnected to the body at the bottom of the body, the bottom flange having, plural spaced apart side portions, each of the plural side portions having a top edge and a bottom edge and two opposing and spaced apart end portions, and plural corner portions, each of the plural corner portions structurally interconnecting adjacent end portions of the plural side portions of the bottom flange to form a bottom base, and the top edge of each of the plural bottom flange side portions is structurally interconnected to the bottom of the body; and a tubular bottom rail is structurally interconnected to the bottom edge of each of the plural bottom edge flange side portions and to a bottom edge of each of the plural bottom flange corner portions.

9. The container for storing, shipping and dispensing a beverage of claim 1 and further comprising:

a concave and inwardly protruding annular depression defined in the body, the concave and inwardly protruding annular depression extending circumferentially about the body spacedly between the top of the body and the bottom of the body.

10. The container for storing, shipping and dispensing a beverage of claim 1 and wherein the top has plural opposing and spaced apart edge portions and an inwardly/downwardly protruding center portion, and the plural opposing and spaced apart edge portions of the top are structurally interconnected to top edges of the generally planar front side, rear side, first lateral side and second lateral side to form a generally concave top of the body.

11. The container for storing, shipping and dispensing a beverage of claim 1 and wherein the bottom has plural opposing and spaced apart edge portions and an outwardly/downwardly protruding center portion, and the plural opposing and spaced apart edge portions of the bottom are structurally interconnected to bottom edges of the generally planar front side, rear side, first lateral side and second lateral side to form a generally convex bottom of the body.

12. The container of claim 1 and wherein the tap coupler anchor is structurally carried on the generally planar front side of the body, and an axis of a spear hole defined by the tap coupler anchor extends perpendicular from the generally planar front portion of the body toward the opposing generally planar portion of the body.

13. The container of claim 1 and wherein the tap coupler anchor is structurally carried on one planar side portion of the body, and a spear hole axis defined by the single spear hole, extends perpendicular from the one planar side portion of the generally rectilinear stainless steel body toward the opposing planar side portion of the generally rectilinear stainless steel body.

14. The container of claim 1 and wherein the top has a perimeter and a concave downwardly protruding center portion and the perimeter of the top is structurally interconnected to top edges of the generally planar front side, the generally planar rear side, the generally planar first lateral side and the generally planar second lateral side, and the top is generally horizontal relative to vertical; and the bottom has a perimeter and a convex downwardly protruding center portion and the perimeter of the bottom is structurally interconnected to bottom edges of the generally planar front side, the generally planar rear side, the generally planar first lateral side and the generally planar second lateral side.

15. A container for storing, shipping and dispensing a bulk quantity of beverage comprising:

a generally rectilinear stainless steel body defining an interior volume, the generally rectilinear body having, a front side, a rear side, a first lateral side and a second lateral side, each of the front side, the rear side, the first lateral side and the second lateral side having spaced apart opposing side edges, spaced apart opposing top and bottom edges, an interior facing surface and an exterior facing surface, and plural curvilinear corner portions, and each of the plural curvilinear corner portions define a radius and structurally interconnects adjacent side edges of the front side, the rear side, the first lateral side and the second lateral side, and a top that is generally horizontal relative to vertical and having plural opposing and spaced apart edge portions and an inwardly/downwardly protruding center portion, and the plural opposing and spaced apart edge portions of the top are structurally interconnected to the top edge of the front side, the rear side, the first lateral side and the second lateral side, and a bottom that is generally horizontal relative to vertical and having plural opposing and spaced apart edge portions and an outwardly/downwardly protruding center portion, and the plural opposing and spaced apart edge portions of the bottom are structurally interconnected to the bottom edge of the front side, the rear side, the first lateral side and the second lateral side, and plural concave and inwardly protruding annular depressions defined in, and spacedly arrayed about the generally rectilinear body, each of the plural concave and inwardly protruding annular depressions extending circumferentially about the generally rectilinear body spacedly between the top and bottom of the generally rectilinear body, a top handle structurally interconnected to the generally rectilinear body at the top of the generally rectilinear body, the top handle having, a tubular handle rail with plural spaced apart side portions, each tubular handle rail side portion having two opposing ends, and plural handle rail corner portions structurally interconnecting adjacent ends of the plural tubular handle rail side portions of the tubular handle rail, and plural top handle supports, each top handle support having a top edge, a bottom edge and two opposing end portions, and each top handle support structurally interconnects, at the top edge thereof, with one of the plural handle rail corner portions of the top handle, and the bottom edge is structurally interconnected with the generally rectilinear body proximate the top of the generally rectilinear body, each of the plural top handle supports defining a cutout, and the plural top handle supports position the top handle spacedly above the top of the generally rectilinear body;

a bottom flange structurally interconnected to the generally rectilinear body proximate the bottom of the generally rectilinear body, the bottom flange having, plural spaced apart side portions, each side portion having a top edge and a bottom edge and two opposing and spaced apart end portions, and plural corner portions, each of the plural corner portions structurally interconnecting adjacent end portions of the plural side portions of the bottom flange, and the top edge of each of the plural bottom flange side portions is structurally interconnected to the bottom of the generally rectilinear body, and a tubular bottom rail structurally interconnected to the bottom edge of each of the plural bottom edge flange side portions and to the bottom edge of each of the plural bottom flange corner portions; and a distance dimension between exterior facing surfaces of diametrically opposing side portions of the bottom flange is less than a distance dimension between interior facing surfaces of diametrically opposing side portions of the top handle so that the bottom flange of the generally rectilinear body axially fits within the top handle of a second generally rectilinear body to facilitate vertical stacking of plural generally rectilinear bodies; and a single spear hole is defined in the generally rectilinear body at a location that is not the top of the generally rectilinear body, and the single spear hole communicates with the interior volume of the generally rectilinear body; and a tap coupler anchor is structurally carried by the generally rectilinear body about the single spear hole, and the tap coupler anchor is accessible for interconnection to a dispensing means when plural of the containers for storing, shipping and dispensing a beverage are stacked one on top of another top to bottom.

16. The container of claim 13 and further comprising:

an angulated tap face that communicates between the top edge of one generally planar side and an adjacent edge of the top, and the angulated tap face carries the tap coupler anchor and defines the spear hole communicating with the interior volume.

17. The container of claim 16 and further comprising:

a setback of the tap coupler anchor from the exterior surface of the body and the angulated tap face allows vertically stacked bodies to be tapped and interconnected to a dispensing coupler to allow beverage to be dispensed from within the interior cavity while plural bodies are vertically stacked one on top of another.

18. The container of claim 15 and further comprising:

a tap recess defined in one of the generally planar sides of the generally rectilinear body spacedly below the top of the generally rectilinear body and protruding inwardly from the generally planar side into the interior volume, the tap recess having a top portion, a bottom portion, a first side portion, a second side portion and a base portion, each of the top portion, the bottom portion, the first side portion, the second side portion and the base portion having opposing edge portions that are structurally interconnected to an adjacent edge portion of an adjacent tap recess portion so as to form a unitary tap recess, and outer edge portions of the tap recess are structurally interconnected to an interior facing surface of the generally planar side of the generally rectilinear body to form a fluid tight and air tight interconnection therebetween; and an annular shaped tap coupler anchor is structurally carried at a generally medial position on the base portion of the tap recess to releasably engage with a tap spear, and a spear hole is defined by the tap coupler anchor; and the spear hole communicates with the interior volume of the generally rectilinear body to allow the tap spear to be at least partially inserted into the interior volume.

19. A container for storing, shipping and dispensing a bulk quantity of beverage comprising:

a generally rectilinear stainless steel body defining an interior volume, the generally rectilinear stainless steel body having, a planar front side, a planar rear side, a planar first lateral side and a planar second lateral side, each of the planar front side, the planar rear side, the planar first lateral side and the planar second lateral side having spaced apart opposing side edges, spaced apart opposing top and bottom edges, an interior facing surface and an exterior facing surface, and plural curvilinear corner portions, and each of the plural curvilinear corner portions define a radius and structurally interconnects adjacent side edges of the planar front side, the planar rear side, the planar first lateral side and the planar second lateral side, and a planar top having plural opposing and spaced apart edge portions, and the plural opposing and spaced apart edge portions of the planar top are structurally interconnected to the top edge of the planar front side, the planar rear side, the planar first lateral side and the planar second lateral side, and a planar bottom having plural opposing and spaced apart edge portions, and the plural opposing and spaced apart edge portions of the planar bottom are structurally interconnected to the bottom edge of the planar front side, the planar rear side, the planar first lateral side and the planar second lateral side; and wherein the planar front side is parallel to the planar rear side, and the planar first lateral side is parallel to the planar second lateral side, and the planar top is parallel to the planar bottom, and a single spear hole is defined in the generally rectilinear stainless steel body at a location that is not the top of the generally rectilinear stainless steel body, and the single spear hole communicates with the interior volume of the generally rectilinear stainless steel body; and a tap coupler anchor is structurally carried by the generally rectilinear stainless steel body about the single spear hole, and the tap coupler anchor is accessible for interconnection to a dispensing means when plural of the containers for storing, shipping and dispensing a beverage are stacked one on top of another top to bottom.

20. The container of claim 19 and further comprising:

threads carried by and defined by the tap coupler anchor to releasably engage with a removable cap to releasably fluidically seal the spear hole.

* * * * *